United States Patent
Chiang et al.

(10) Patent No.: US 10,354,161 B2
(45) Date of Patent: Jul. 16, 2019

(54) DETECTING FONT SIZE IN A DIGITAL IMAGE

(71) Applicant: INTUIT INC., Mountain View, CA (US)

(72) Inventors: Peijun Chiang, Mountain View, CA (US); Vijay Yellapragada, Mountain View, CA (US)

(73) Assignee: INTUIT, INC., Mountain View, CA (US)

( * ) Notice: Subject to any disclaimer, the term of this patent is extended or adjusted under 35 U.S.C. 154(b) by 106 days.

(21) Appl. No.: 15/614,298

(22) Filed: Jun. 5, 2017

(65) Prior Publication Data

US 2018/0349722 A1    Dec. 6, 2018

(51) Int. Cl.
*G06K 9/32* (2006.01)
*G06T 7/11* (2017.01)
*G06K 9/46* (2006.01)
*G06K 9/34* (2006.01)
*G06K 9/00* (2006.01)
*G06K 9/20* (2006.01)
*G06K 9/48* (2006.01)

(52) U.S. Cl.
CPC ......... *G06K 9/325* (2013.01); *G06K 9/00442* (2013.01); *G06K 9/2081* (2013.01); *G06K 9/344* (2013.01); *G06K 9/46* (2013.01); *G06K 9/4604* (2013.01); *G06K 9/48* (2013.01); *G06T 7/11* (2017.01); *G06K 2209/01* (2013.01)

(58) Field of Classification Search
CPC .......... G06K 9/325; G06K 9/344; G06K 9/46; G06K 9/4604; G06T 7/11
USPC ....................................... 382/176
See application file for complete search history.

(56) References Cited

U.S. PATENT DOCUMENTS

| | | | | |
|---|---|---|---|---|
| 5,825,919 A * | 10/1998 | Bloomberg | ........ | G06K 9/00463 382/177 |
| 9,760,788 B2 * | 9/2017 | Shustorovich | ..... | G06K 9/00463 |
| 2011/0007366 A1 * | 1/2011 | Sarkar | ................ | G06K 9/00456 358/462 |
| 2011/0007970 A1 * | 1/2011 | Saund | ................ | G06K 9/00449 382/176 |
| 2013/0294695 A1 * | 11/2013 | Meunier | .............. | G06K 9/6828 382/182 |
| 2013/0314755 A1 | 11/2013 | Blose et al. | | |
| 2015/0049948 A1 | 2/2015 | Bala | | |
| 2017/0011272 A1 * | 1/2017 | Barton | .................... | G06K 9/18 |
| 2018/0096200 A1 * | 4/2018 | Krivopaltsev | ..... | G06K 9/00463 |

OTHER PUBLICATIONS

International Search Report and Written Opinion dated Feb. 27, 2018 for Application No. PCT/US2017/036292.

* cited by examiner

*Primary Examiner* — Jonathan S Lee
(74) *Attorney, Agent, or Firm* — Patterson + Sheridan, LLP (57) ABSTRACT

The present disclosure relates to optical character recognition, and more specifically techniques for detecting font size in a digital image. Accordingly to one embodiment, a client device receives a digital image of a document having one or more textual components. The client device finds one or more contours bounding the one or more textual components in the digital image of the document. The client device detects a font size for text contained in the digital image using the one or more contours. The client device extracts the text from the digital image upon detecting that the detected font size is above a defined threshold value.

20 Claims, 6 Drawing Sheets

DETECTING FONT SIZE IN A DIGITAL IMAGE

FIELD

The present disclosure relates to optical character recognition, and more specifically techniques for detecting font size in a digital image.

BACKGROUND

As mobile devices gain in popularity, a variety of mobile applications continue to be developed for users to perform a variety of tasks. For example, users may use a camera integrated into or otherwise connected to a mobile device to upload images of documents, which may provide a mobile application with data for use in providing a variety of services such as tax preparation, expense tracking, record keeping, and the like. In some cases, however, a document may be very large and contain text with a very small font size. In such cases uploading an image that captures the entire document in one frame may result in the mobile application being unable to recognize the text contained in the image or extract any information from it. In addition, viewing the uploaded document in the user interface of the mobile application may provide the user with a suboptimal user experience because the document may not be legible.

A number of methods have been developed to detect the size of text contained in a document but they are all computation intensive and inefficient thereby providing no use in cases where a font size may need to be detected in very little time, such as during the few seconds of when a user is attempting to capture an image of a document by, for example, holding the camera of a mobile phone over the document while providing a live camera feed thereof.

SUMMARY

One embodiment presented herein includes a computer-implemented method for optical character recognition on a digital image of a document. The method comprises receiving a digital image of a document having one or more textual components. The method further comprises finding one or more contours bounding the one or more textual components in the digital image of the document. The method further comprises detecting a font size for text contained in the digital image using the one or more contours. The method further comprises extracting the text from the digital image upon detecting that the detected font size is above a defined threshold value.

Another embodiment presented herein includes a system for performing optical character recognition on a digital image of a document. The system comprises a processor and a memory comprising instructions which, when executed on the processor, performs an operation for performing optical character recognition on a digital image of a document. The operation comprises receiving a digital image of a document having one or more textual components. The operation further comprises finding one or more contours bounding the one or more textual components in the digital image of the document. The operation further comprises detecting a font size for text contained in the digital image using the one or more contours. The operation further comprises extracting the text from the digital image upon detecting that the detected font size is above a defined threshold value.

Another embodiment presented herein includes a computer-readable medium comprising instructions which, when executed on one or more processors, performs an operation for performing optical character recognition on a digital image of a document. The operation comprises receiving the digital image of the document having one or more textual components. The operation further comprises finding one or more contours bounding the one or more textual components in the digital image of the document. The operation further comprises detecting a font size for text contained in the digital image using the one or more contours. The operation further comprises extracting the text from the digital image upon detecting that the detected font size is above a defined threshold value.

DETAILED DESCRIPTION

Embodiments presented herein provide techniques for real-time detection of font size in a digital image while performing optical character recognition on text depicted in the digital image. Additionally, the embodiments presented herein provide techniques for guiding users of an application (e.g., mobile or software application) in capturing digital images of a document for analysis based on the detected font size of the digital image. By detecting the font size of text captured in a digital image in real-time, a computer system can dynamically adjust the resolution of a digital image used to perform optical character recognition of a document, which may improve the accuracy of optical character recognition processes performed on documents depicted in digital images.

For example, a user of an application may interact with the application, residing on a client device, by providing the application with a live camera feed using a camera housed by the computing device. The live camera feed may capture content of, for example, a document that includes text. Using an optical character recognition (OCR) functionality, e.g., within the application, the computing device may then detect the font size of the text as it appears in a video frame or digital image provided by the live camera feed. Based on detecting the font size, using the application, the computing device may then prompt the user to zoom in or out or adjust the distance between the camera and the document before any images are captured for uploading. For example, instead of capturing and uploading a single image from the entire document, the user may be prompted to zoom in with the camera and capture two pictures, one from the top half of the document and another from the bottom half. Uploading images with the camera zoomed in may increase the likelihood that the font size of the text in the images provided is large enough such that the text can be recognized and extracted for analysis and use by the OCR functionality. In addition, the application may stitch together the two images from the two halves of the document to create and present the user with a single image having text with a large enough font size such that the content of the image is easily readable by the user.

Different aspects of these techniques are described in more detail herein, along with additional examples of how the techniques, described above, may be used to detect a font size in a digital image in real time to improve the accuracy of optical character recognition processes on documents depicted in digital images.

Figure 1:
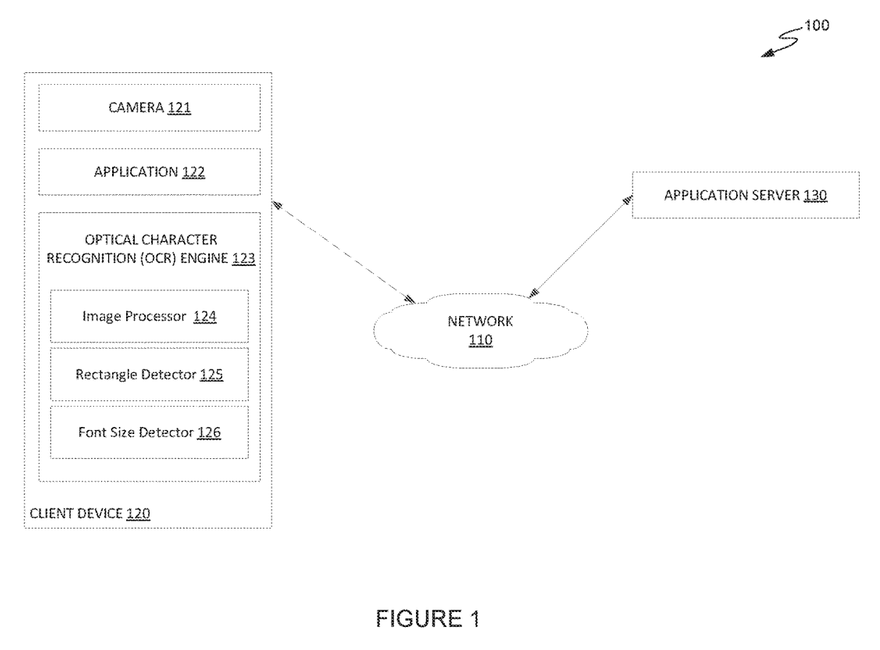
FIG. 1 illustrates an example computing environment, in accordance with some embodiments.

FIG. 1 illustrates an example networked computing environment for performing optical character recognition and font size detection using a digital image (interchangeably referred to as a video frame) from a stream of digital images captured by a client device, according to some embodiments of the present disclosure. As illustrated, computing environment 100 includes a client device 120 and application server 130, connected via network 110.

Client device 120 may be, for example, a smartphone, tablet computer, handheld personal computer. As illustrated, client device 120 generally includes a camera 121, an application 122, and OCR engine 123.

Camera 121 is generally configured to capture still digital images and video (stream of digital images/frames) of a document to be analyzed by OCR engine 123. Camera 121 may provide a buffer to store video frames or a stream of images while OCR engine 123 processes a frame, detects a font size of text depicted in the frame, and extracts the text therein. While camera 121 captures a stream of frames/digital images, camera 121 may adjust focus, lighting, contrast, exposure settings, and so on to attempt to obtain a clear image of a document. Camera 121 may continually adjust camera settings until client device 120 completes character recognition operations for the document.

Application 122 generally allows a user to interact with an application hosted on application server 130 and/or local resources on client device 120. In some cases, a user can invoke OCR engine 123 to capture a digital image of a document via camera 121 and extract text from the captured image. The text extracted from the digital image of the document may then be processed locally by application 122 or transmitted to application server 130 for processing. In some embodiments, OCR engine 123 may be a functionality within application 122. In some embodiments, OCR engine 123 may communicate with application 122 but be a functionality separate from application 122.

Application server 130 generally includes one or more remote services hosting at least portions of an application accessible through client device 120. Data may be received from client device 120 (e.g., upon extraction from an image captured by a camera on client device 120, as discussed above), and the received data may be processed according to the capabilities of application server 130. For example, if client device 120 provides textual information related to a W-2 wage statement to application server 130 hosting a tax preparation workflow, application server 130 can use the received wage information to determine a user's tax liability or entitlement to a tax refund. In another example, if client device 120 provides textual information related to a receipt for goods or services to application server 130 hosting an accounting workflow, application server 130 can use the received expenditure information to update a user's account balances, cumulative tax deductible expenditures for a tax year, and the like.

OCR engine 123 is generally configured to obtain a digital image in a stream of digital images from camera 121 and extract textual content from a document included in the digital image. To obtain a digital image for analysis, OCR engine 126 generally instantiates a live camera feed to obtain one or more digital images in a stream of digital images from a buffer at camera 121. After obtaining the digital image, OCR 123 may attempt to detect a font size of text depicted in the digital image by using image processor 124, rectangle detector 125, and font size detector 126.

Image processor 124, in some embodiments, processes a received raw digital image such that it is then able to be further processed by rectangle detector 125. Rectangle detector 125, in some embodiments, creates rectangles that bound textual components in the digital image, including words, numbers, or groups of words and numbers in the text. As further described in relation to FIG. 4, rectangle detector 125 also calculates the height of each of the rectangles created in the image and also computes a mean height for all the rectangles created in the digital image. As further described in relation to FIGS. 4-5, the mean height for all the rectangles in the digital image may then be used by font size detector 126 to determine the font size of the text in the digital image.

As described above, a user may provide a live feed (i.e., stream of frames/digital images) of a document or a still digital image of the document for use by OCR engine 123 and application 122. The document may, as described above, be any document that includes text. As an example, the document may be a bank statement, a document used for tax preparation, such as a W2, a receipt, etc.

Figure 2:
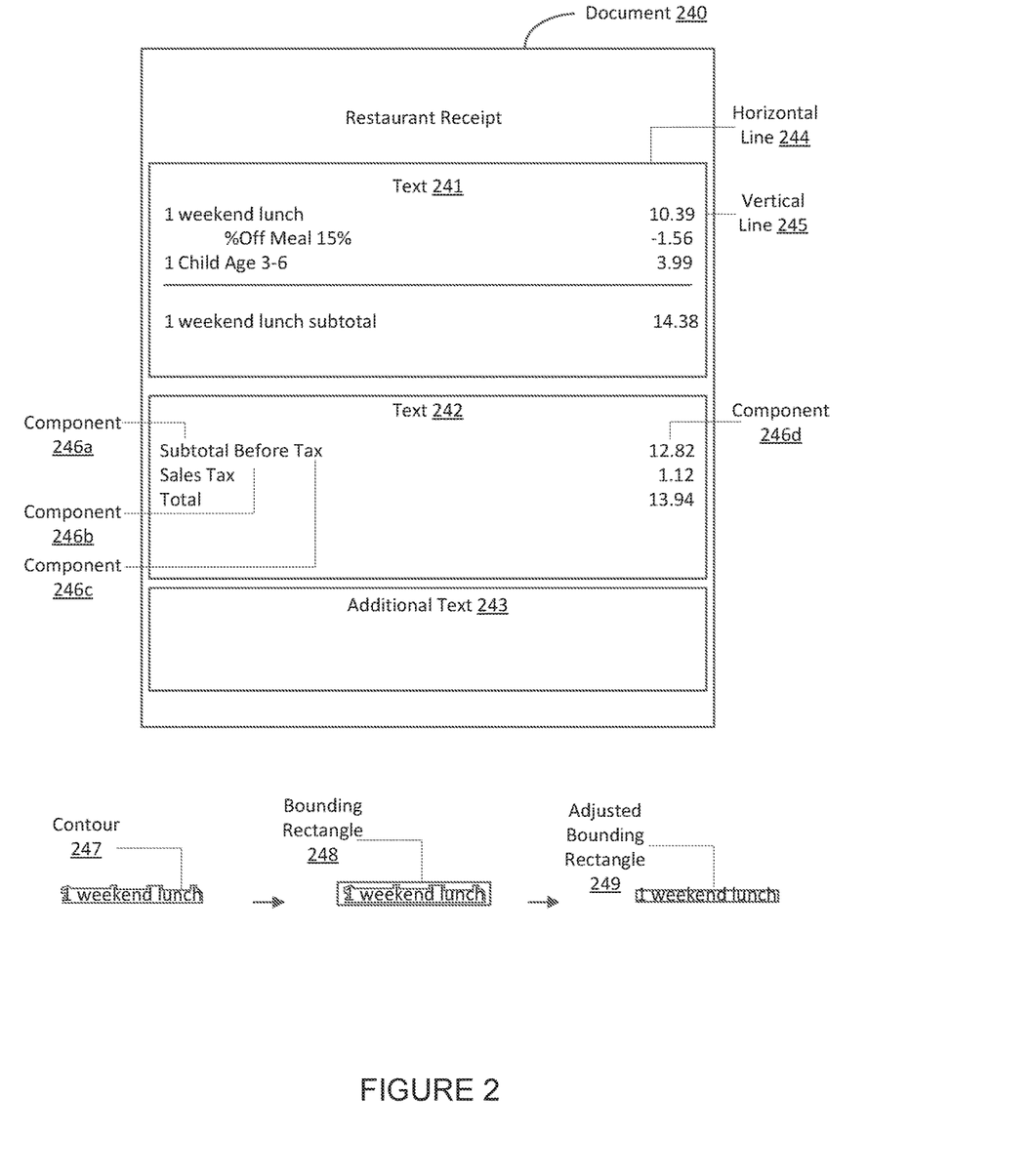
FIG. 2 illustrates an example digital image of a document, in accordance with some embodiments.

FIG. 2 illustrates an example of a digital image of document 240, which is an example of a document described above. As shown in FIG. 2, document 240 is a restaurant receipt that a user may attempt to upload for use by OCR engine 123 and application 122. For example, application 122 may be a personal finance application for keeping track of expenses or the like. Document 240 includes text 241, text 242, and additional text 243. As shown, document 240 includes horizontal lines and vertical lines to, for example, separate various sections of document 240. For example, a rectangle-shaped box, including horizontal line 244 and vertical line 245, is used to encompass text 241 and separate it from text 242.

In some embodiments, each word, figure, a group of words or figures, or textual logo in document 240 may be referred to as a component. For example component 246a refers to the word "Subtotal," component 246b refers to the word "Before," component 246c refers to the word "Tax," and component 246d refers to the figure "12.82."

FIG. 2 also shows contour 247, bounding rectangle 248, and adjusted bounding rectangle 249 generated for a group of components ("1 weekend lunch") in a digital image of document 240. Contour 247, bounding rectangle 248, and adjusted bounding rectangle 249 may be generated in real time responsive to input of a digital image from a live camera feed, as described in further detail below in FIGS. 3-5. In some embodiments, the operations described in FIGS. 3-5, to generate contours, bounding rectangles, and adjusted bounding rectangles for use in determining a font size of textual content in an image, may be performed on some or all components in the text of the digital image of document 240. For illustration purposes, however, FIG. 2 shows an example contour 247, bounding rectangle 248, and adjusted bounding rectangle 249 only for the group of components "1 weekend lunch," as described above.

Figure 3:
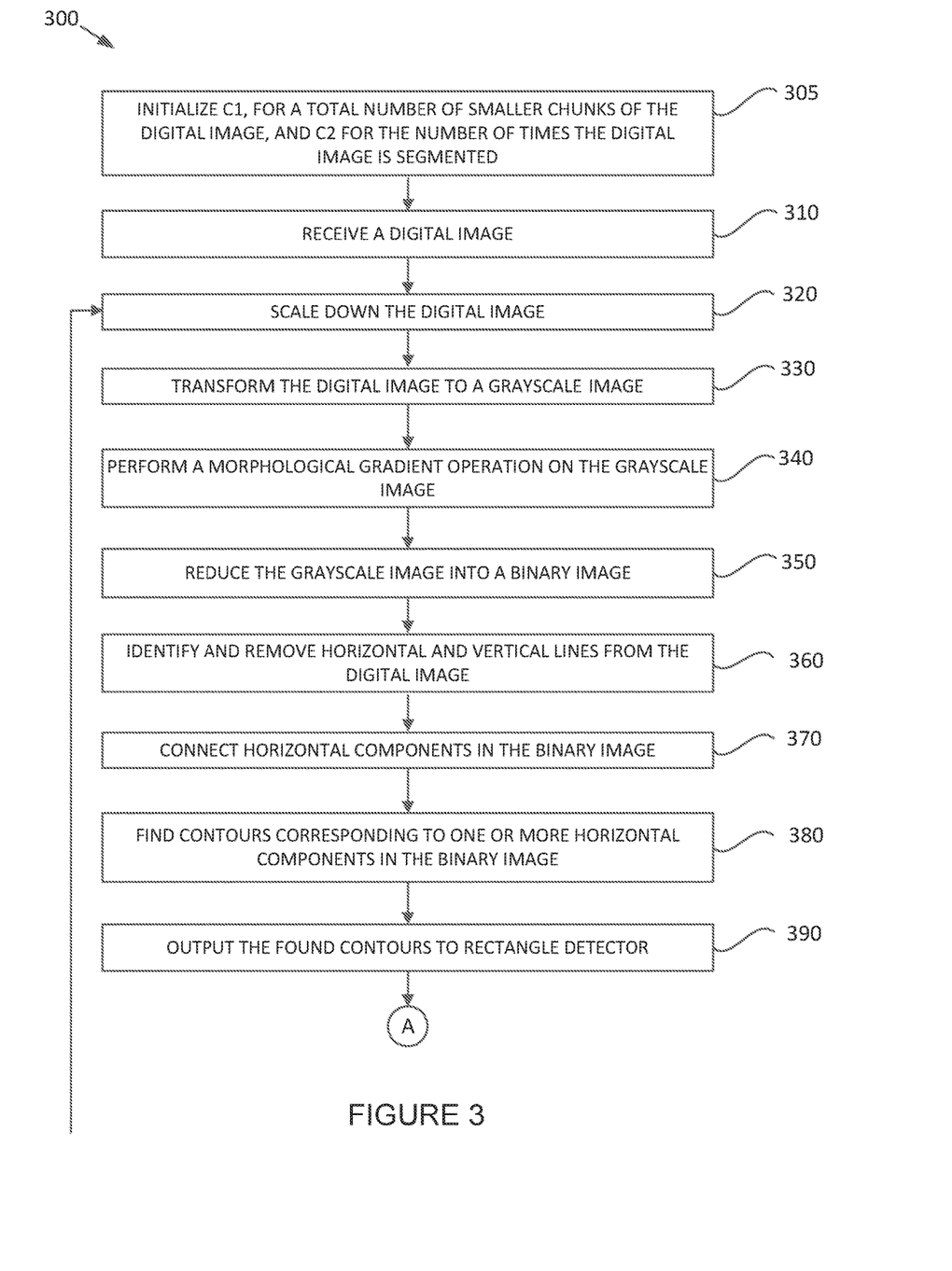
FIG. 3 illustrates example operations for identifying areas of text content in a digital image depicting a document, in accordance with some embodiments.

As illustrated, contour 247, which bounds the group of components "1 weekend lunch," is an example of a contour that is found or created as a result of step 380 of FIG. 3. Contours, as further described in relation to FIG. 3, are a form of outline for bounding the shape or form of a component (e.g., words, figure, logos, etc.) or a group of components of the text in a document. Bounding rectangle 248, which encompasses contour 247, is an example of a bounding rectangle created as a result of step 410 of FIG. 4. A bounding rectangle is created to completely encompass a contour, such as contour 247. Adjusted bounding rectangle 249 is an example of an adjusted bounding rectangle resulting from step 440 of FIG. 4. An adjusted bounding rectangle is a bounding rectangle, such as bounding rectangle 248, whose height has been adjusted to represent the average height of the letters of a component bounded by a contour.

As described above, in some embodiments, a user may attempt to upload a digital image of document 240, which is a restaurant receipt, for use by OCR engine 123 and application 122. For example, once uploaded, OCR engine 123 may extract information included in the digital image of document 240 to send to application 122, which may then use the information to analyze and keep track of expenses incurred by the user. In some embodiments, however, the likelihood that OCR engine 123 is able to extract information from the digital image of document 240 is increased if the data (e.g., text) included in the digital image received by OCR engine 123 has a minimum quality and size. If resolution and quality of the digital image does not meet a threshold resolution or quality, however, optical character recognition (OCR) operations performed on the digital image may fail to extract usable text from the digital image.

To allow for OCR engine 123 to extract usable text from a digital image, embodiments of the present disclosure provide for detecting the font size of the text included in the digital image to determine whether the digital image has sufficient resolution and quality to allow for the successful extraction of the text from the image. In some embodiments, a user may initiate a document capture process through a user interface of application 122, executing on client device 120 and displayed on a display thereof, where the user captures one or more digital images of document 240 using camera 121. In some embodiments, application 122 may then prompt the user to hold client device 120 over document 240 such that camera 121 is facing document 240 before an image of document 240 is captured. In such embodiments, while facing document 240, camera 121 is providing a live camera feed of document 240 to OCR engine 123. OCR engine 123 may receive the live feed in video frames or a stream of digital images. For example, if camera 118 has a 30 frame-per-second capability, 30 frames or digital images may be provided to OCR engine 123 during a second of camera 118 facing document 240. In some embodiments, as described in relation to FIGS. 3, 4, and 5, OCR engine 123 may process one or more digital images provided by live feed to detect the font size of the text contained therein.

FIG. 3 illustrates example operations 300 for identifying areas of text content in a digital image depicting a document, in accordance with some embodiments.

At 305, image processor 124 initializes counters C1 and C2. C1 is a counter for the running total number of smaller chunks of a digital image, such as the digital image received at step 310, as further described in relation to step 540 of FIG. 5. C2 is a counter for the number of times the digital image received at step 310 undergoes the operation of being broken into smaller chunks, such as in step 540 of FIG. 5.

At 310, image processor 124 of OCR engine 123 receives a digital image of document 240. As described above, the digital image that OCR engine 123 receives is, in some embodiments, a digital image (i.e. video frame) from a stream digital images provided by the live camera feed through camera 121 while the user is, for example, holding client device 120 over document 240.

At 320, image processor 124 scales down the digital image received at step 310. In some embodiments, image processor 124 may scale down the digital image such that the longest side of the digital image is set to a defined or configurable number of pixels. Scaling down the digital image, in some embodiments, may help expedite performing the next steps of the operations described herein.

At 330, image processor 124 transforms the digital image into a grayscale image. A grayscale image is, in some embodiments, a digital image in which the value of each pixel carries only intensity information.

At 340, image processor 124 performs a morphological gradient operation on the grayscale image resulting in an image where each pixel value indicates the contrast intensity in the close neighborhood of that pixel. In mathematical morphology, a morphological gradient refers to the difference between the dilation and the erosion of a given image. In some embodiments, the morphological gradient operation extracts various components of the text (e.g., words, figures, textual logos) in the digital image for use in the representation of boundaries or contours, e.g., contour 247, as described below.

At 350, image processor 124 reduces the grayscale image of step 340 to a binary image. In some embodiments, image processor 124 may perform this reduction using Otsu's method, which is a method for performing clustering-based image thresholding. Thresholding is a method of image segmentation used for creating a binary image from a grayscale image.

At 360, image processor 124 identifies and removes horizontal and vertical lines from the binary image. As described above in relation to FIG. 2, the digital image of document 240 may contain a number of horizontal and/or vertical lines, such as horizontal line 244 and vertical line 245.

At 370, image processor 124 connects horizontal components in the binary image. As described above in relation to FIG. 2, the digital image of document 240 contains components such as components 246a, 246b, and 246c. For example components 246a, 246b, and 246c are horizontal components that image processor 124 connects together such that, for example, they may be considered as one unit for purposes of generating contours, as described in relation to step 380. In some embodiments, image processor 124 may only connect horizontal components that are not separated by a large white space. For example, components 246a, 246b, and 246c are separated by a large white space from component 246d. In such an example, as described above, image processor 124 may group components 246a, 246b, and 246c together but not include component 246d. In some other embodiments, a large white space between horizontal components may not be considered when grouping horizontal components together. In such embodiments, image processor 124 may connect components 246a, 246b, and 246c as well as component 246d together.

At 380, image processor 124 finds contours corresponding to one or more horizontal components in the binary image. As described above, a contour may, for example, be a curve connecting all continuous points along the boundary of a shape or form such as a component or a group of horizontally connected components in a document. In a digital image, the contour of a given pattern is a set of boundary pixels, an ordered sequence of which may be used to extract the general shape of the pattern. An example of a contour is shown in FIG. 2 as contour 247. As described above, it is important to note that although only contour 247 is shown in FIG. 2, when the binary image of document 240 undergoes step 380 of the operations, contours may be found by image processor 124 for some or all horizontally connected components as well as other components in the binary image. For example, similar to the horizontally connected components "1 weekend lunch" for which contour 247 was found, a contour (not shown) may also be found for horizontally connected components 246a, 246b, and 246c, referring to the group of words "subtotal before tax." In addition, a contour (not shown) may be found for component 246d as well as other components in the digital image of document 240.

At 390, image processor 124 outputs the contours found at step 380 to rectangle detector 125.

Figure 4:
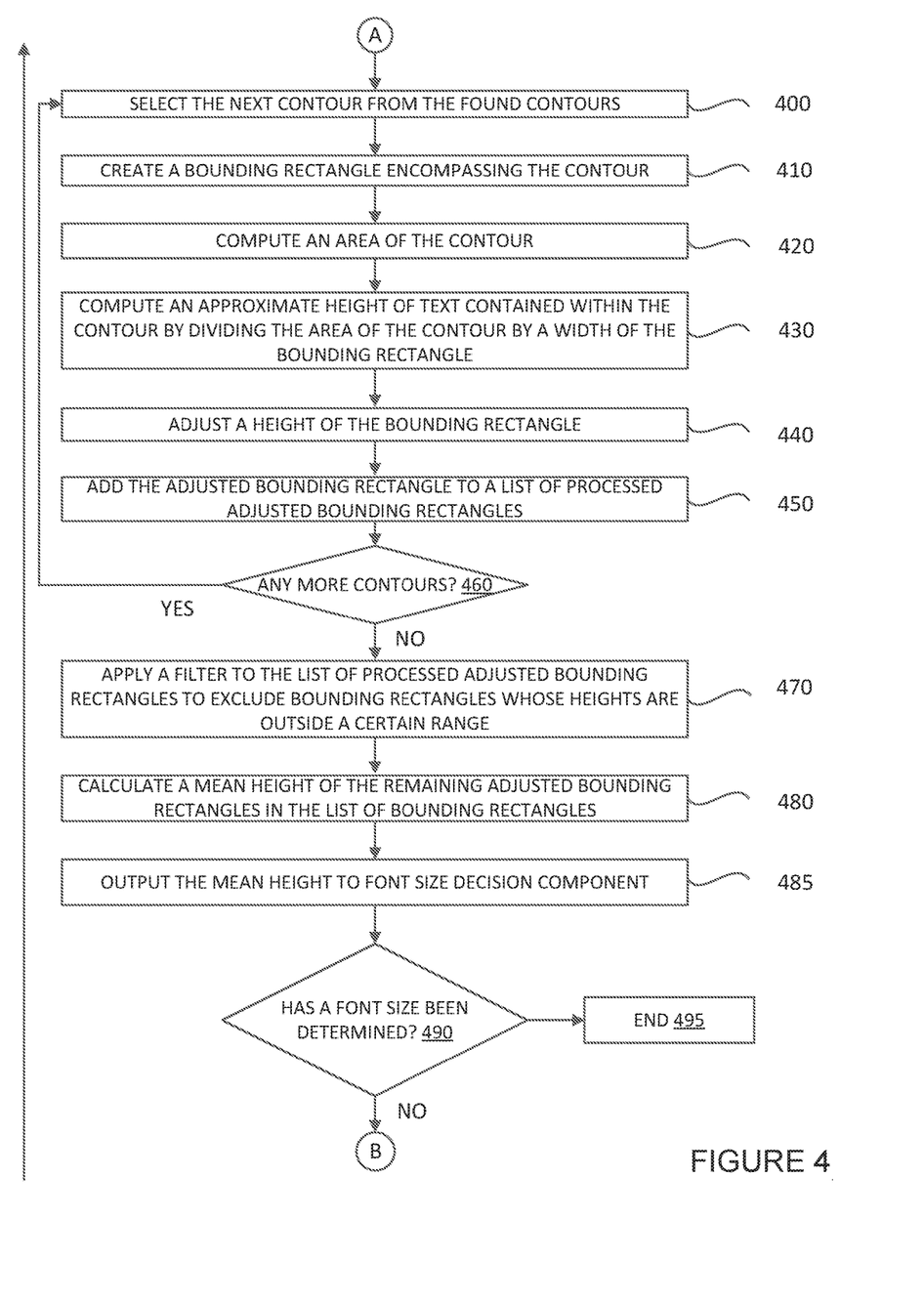
FIG. 4 illustrates example operations for determining whether a font size can be detected for text in a digital image, in accordance with some embodiments.

FIG. 4 illustrates example operations for determining whether a font size can be detected for text in a digital image, in accordance with some embodiments.

At 400, rectangle detector 125 of OCR engine 123 selects a contour from the found contours received from image processor 124. For example, after receiving the found contours from image processor 124, rectangle detector 125 starts with selecting the first contour (e.g. contour 247).

At 410, rectangle detector 125 creates a bounding rectangle encompassing the contour. In some embodiments, the top side of a bounding rectangle has a Y coordinate that is higher (e.g., by one or more pixels) than the top most point of the contour. In addition, the bottom side of the bounding rectangle has a Y coordinate that is lower (e.g., by one or more pixels) than the lowest point of the contour. Similarly, the right side of the bounding rectangle has an X coordinate that is further to the right of the right most point of the contour by one or more pixels. In addition, the left side of the bounding rectangle has an X coordinate that is further to the left of the left most point of the contour by one or more pixels. Bounding rectangle 248 is an example of how, at 410, rectangle detector 125 creates a bounding rectangle that encompasses contour 247 of the horizontally connected components "1 weekend lunch."

At 420, rectangle detector 125 computes an area of the contour. For instance, rectangle detector 125 computes the area of contour 247. In some embodiments, each contour may be a polygon whose area may be calculated using a number of mathematical methods (e.g., Green's theorem).

At 430, rectangle detector 125 computes an approximate height of the text contained within the contour by dividing the area of the contour by the width of the bounding rectangle. For example, rectangle detector 125 computes the approximate height of the text "1 weekend lunch" contained within contour 247 by dividing the area of contour 247 by the width of bounding rectangle 248.

At 440, rectangle detector 125 adjusts the height of the bounding rectangle based on the approximate height of the text. For example, rectangle detector 125 adjusts the height of bounding rectangle 248 to create adjusted bounding rectangle 249. The height of the bounding rectangle is adjusted in order to represent or correspond to the average height of all the letters in a component or a group of horizontally connected components (i.e. the height of the majority of the letters). For example, in case of the horizontally connected components "1 weekend lunch," letters "k" or "l" have a height that is larger than the height of the rest of the letters (e.g., the letters "e" or "n") and are, therefore, outliers. As a result, the height of a bounding rectangle that is not adjusted based on the average height of all the letters in "1 weekend lunch" may not provide an accurate indication of the corresponding font size.

At 450, rectangle detector 125 adds the adjusted bounding rectangle (e.g., adjusted bounding rectangle 249) to a list of adjusted bounding rectangles.

At 460, rectangle detector 125 determines if there are any more contours to be selected from the found contours received from image processor 124. For example, after performing operations 410-440 on contour 247, rectangle detector 125 may select the next contour (not shown) bounding, e.g., the figure "10.39," and repeat performing operations 410-450 on the contour. Rectangle detector 125 may then move on to selecting the next contour until all contours received from image processor 124 have undergone steps 410-450 of the operations. If there are, however, no other contours left to be selected, rectangle detector 125 then moves to step 470.

At 470, rectangle detector 125 applies a filter to the list of processed adjusted bounding rectangles to exclude adjusted bounding rectangles whose heights are outside a certain range. For example, in some embodiments, any adjusted bounding rectangles whose height is outside of one standard deviation of the mean height of all the adjusted bounding rectangles may be excluded from the data set. In some other embodiments, other methods for excluding outliers from the list of adjusted bounding rectangles may be used.

At 480, rectangle detector 125 calculates a mean for the remaining adjusted bounding rectangles from the list of processed adjusted bounding rectangles. Rectangle detector 125 may then track the mean height, as a potential font size, to be compared with mean heights subsequently calculated for the smaller chunks of the digital image, as described below.

At 485, rectangle detector 125 may output the mean height to font size detector 126 to detect a font size for the digital image of document 240. In some embodiments, however, font size detector 126 may be configured to consider at least a certain number (e.g., 2) of mean heights, resulting from running smaller chunks of the digital image through steps 320-485, before determining that a font size has been detected.

For example, in some embodiments, after receiving a subsequent mean height from rectangle detector 125 resulting from running a smaller chunk of the digital image through operation 320-485, font size detector 126 may compare the subsequent mean height with the mean height corresponding to the original digital image. In some embodiments, if the two mean heights differ only by a certain number of pixels, font size detector 126 may determine that the mean height detected during the first run at step 480 is accurate enough and, therefore, indicate to rectangle detector 125 that a font size has been detected. However, in embodiments where the subsequent mean height corresponding to a smaller chunk differs from the first mean height corresponding to the original digital image by more than a certain number of pixels, font size detector 126 may then determine whether additional subsequent mean heights for additional smaller chunks are converging to a stable value. In such embodiments, font size detector 126 may similarly indicate to rectangle detector 125 that a font size has been detected. Alternatively, font size detector 126 may signal to rectangle detector 125 that a font size has not been detected so that rectangle detector 125 may move on to the next step in the operations.

Figure 5:
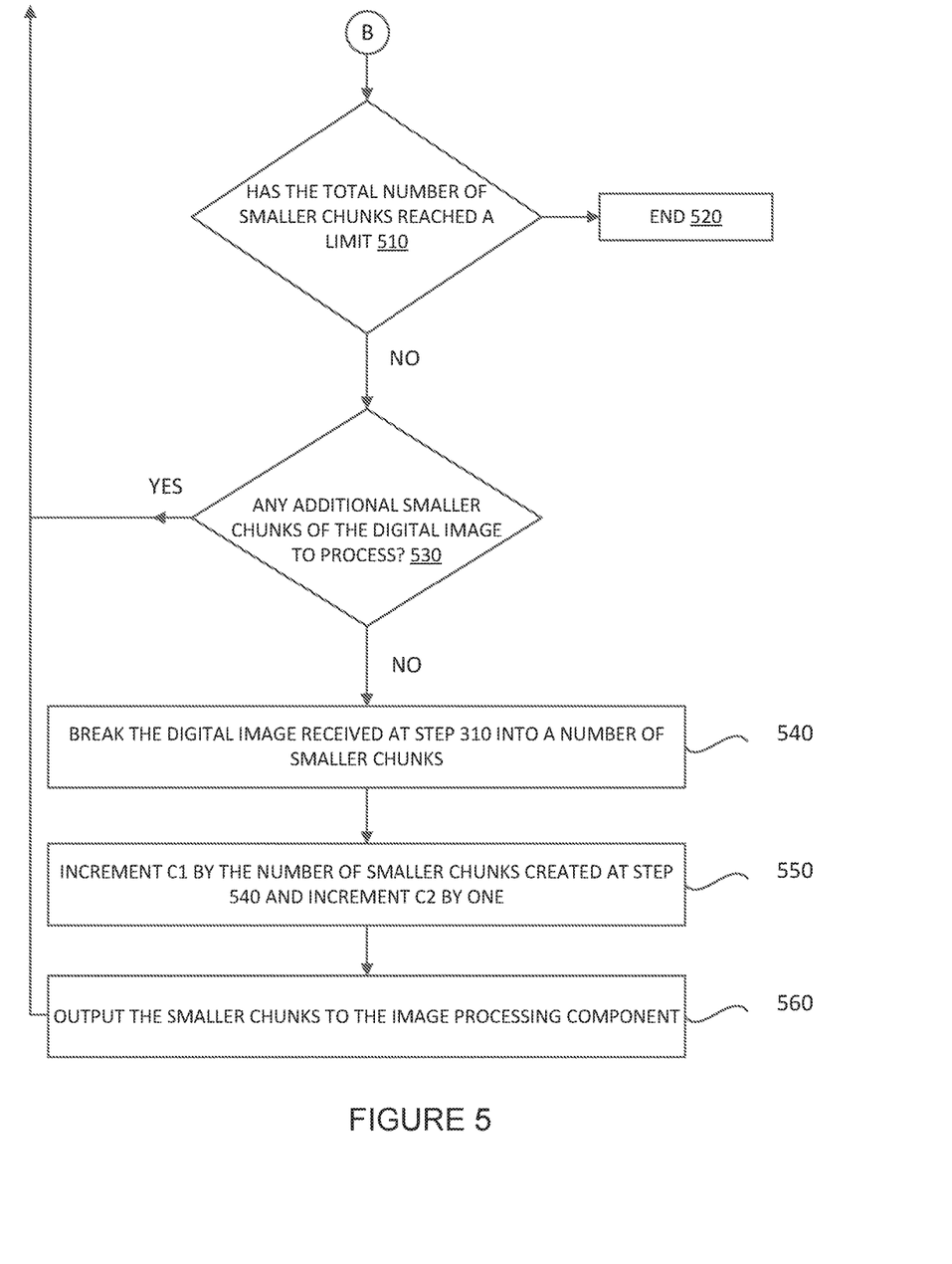
FIG. 5 illustrates example operations for segmenting a digital image into a plurality of chunks, in accordance with some embodiments.

At 490, rectangle detector 125 receives the indication, described above, from font size detector 126 and determines if a font size has been detected. If yes, then rectangle detector 125 ends the operation at 495. If not, the operation may continue to step 510.

FIG. 5 illustrates example operations for segmenting a digital image into a plurality of chunks, in accordance with some embodiments.

At 510, rectangle detector 125 determines whether the total number of smaller chunks has reached a limit. In some embodiments, as described in relation to step 305, counter C1 is initialized for counting the number of smaller chunks created (described in step 540) as a result of rectangle detector 125 partitioning the original digital image received at step 310. In some embodiments, rectangle detector 125 may be configured to have a limit on the total number of smaller chunks created as a result of step 540 of the operations described below. If that limit has been reached, then rectangle detector 125 ends the operations at step 520. However, if the limit has not been reached, rectangle detector 125 continues to step 530. For example, during the first run of the operations of FIGS. 3-5, C1 has a value of zero, which provides an indication to rectangle detector 125 that the operations may continue to step 530. In some embodiments, instead of rectangle detector 125 making a determination as to whether the total number of smaller chunks has reached a limit, rectangle detector 125 may output the value of counter C1 to font size detector 126 so that font size detector 126 may make that determination. In such embodiments, rectangle detector 125 may then receive an indication from font size detector 126 regarding whether the limit has been reach and whether rectangle detector 125 may continue with the operations.

In some embodiments, the configurable limit on the total number of smaller chunks, described above, is set to ensure that rectangle detector 125 does not continue in an infinite loop and waste computing resources. As described above, in some embodiments, the operations of FIGS. 3-5 are executed during a very short period of time (e.g., 1 second) between when a user holds client device 120 on top of document 240 and when the user actually captures an image of document 240. As a result, allowing rectangle detector 125 to continue to break the original digital image into smaller chunks after a certain point in time may merely result in an ineffective use of CPU cycles.

At 530, rectangle detector 125 determines if there are any additional smaller chunks of the digital image to process. During the first run of the operations of FIGS. 3-5, the digital image received at step 310 has not yet been broken into smaller chunks. Accordingly, during the first run, rectangle detector 125 moves to step 540. However, during subsequent runs of the operation, when there are additional smaller chunks of the digital image created as a result of step 540, rectangle detector 125 may output each of the smaller chunks of the digital image to image processor 124, rectangle detector 125, and font size identifier 126 for processing, as discussed above.

At 540, rectangle detector 125 breaks or partitions the digital image received by image processor 124 at step 310 into a configurable or defined number of chunks. For example, in some embodiments, rectangle detector 125 may receive the original digital image of document 240 from image processor 124 and break it into four smaller chunks. In some other embodiments, other ratios may be used for partitioning the original digital image.

In some embodiments, as described above, counter C2 may be maintained for tracking the number of times rectangle detector 125 has broken the digital image received at 310 into smaller chunks (i.e., the number of times the digital image has undergone step 540). Rectangle detector 125 may then use a different ratio for breaking the digital image depending on the value of C2 (e.g., use a ratio that increases the number of segments in which the digital image is divided as the value of C2 increases). For example, during the first run of the operations of FIGS. 3-5, C2 has a value of 0, based on which rectangle detector 125 may use a ratio of 4 in order to break the digital image received at step 310 into four smaller chunks. However, the next time rectangle detector 125 reaches step 540 of the operations, C2 has a value of 1, based on which rectangle detector 125 may use a ratio of eight in order to break the digital image received at step 310 into eight smaller chunks. In some embodiments, one reason for rerunning the operations of FIGS. 3-5 on the smaller chunks of the digital image is that when the original digital image is scaled down at step 310, in some cases, multiple lines of the text contained in the digital image may get combined and appear as a single item or component with a height that is much larger than the height of an actual single line in the digital image. The bounding rectangle for such an item may then contain multiple lines of text and, therefore, result in an incorrect calculation of the size of the font.

At 550, rectangle detector 125 increments the value of C1 by the number of smaller chunks created at step 530. For example, if the digital image received at step 310 was broken into 4 smaller chunks, the value of C1 is incremented to 4. Rectangle detector 125 also increments the value of C2, for example, to 1 because the digital image has now been broken into smaller chunks only once.

At 560, rectangle detector 125 may then output the four smaller chunks of the original digital image, created at step 540, back to image processor 124 so that each of the four smaller chunks may undergo steps 320 to 530 again. What results from each of the 4 smaller chunks undergoing steps 320 to 530, is a group of 4 mean heights, each of which corresponding to one of the 4 smaller chunks.

As described above, in some embodiments, font size detector 126 may detect a font size, which results in ending the operations of FIGS. 3-5. In such embodiments, font size detector 126 may further determine that the font size is too small for the text to be recognized by an OCR operation or be legible by the user. For example, in some embodiments, the user may be attempting to upload document 240 by holding client device 120 such that the entire document 240 may be captured in one image. However, document 240 may include text with a very small font size. In such embodiments, after receiving an indication from OCR engine 123 that a font size detected for the document is very small, application 122 may prompt a message to the user in a user interface to perform one or more actions.

In some embodiments, the message may direct the user to zoom camera 121 in or reduce the distance between camera 121 and document 240 before an image of the document is captured. In some embodiments, application 122 may also prompt the user to capture a larger number of images from the document with camera 121 zoomed in or the distance between the camera 121 and document 240 reduced. For example, application 122 may prompt the user to capture two images, each image capturing a different half of the document, and upload them for use by OCR 123 and application 122. This may provide OCR engine 123 with two images, each having font size that is large enough for the corresponding text to be recognized by an OCR process. For example, one digital image may be captured from the portion of document 240 that contains text 241 and another digital image may be captured from the portion of document 240 that contains text 242 and additional text 243. In some embodiments, application 122 may also use the two images for providing a better user experience to the user. For example, application 122 may stitch or bind the two images together to create a single image of document 240 with font size that is large enough to be legible by user 120.

In some embodiments, however, OCR engine 123 may be unable to detect a font size for text in a digital image. In such embodiments, application 122 may receive an indication from OCR engine 123 to that effect and similarly prompt a message to the user to perform the actions described above, just in case the font size is small.

Figure 6:
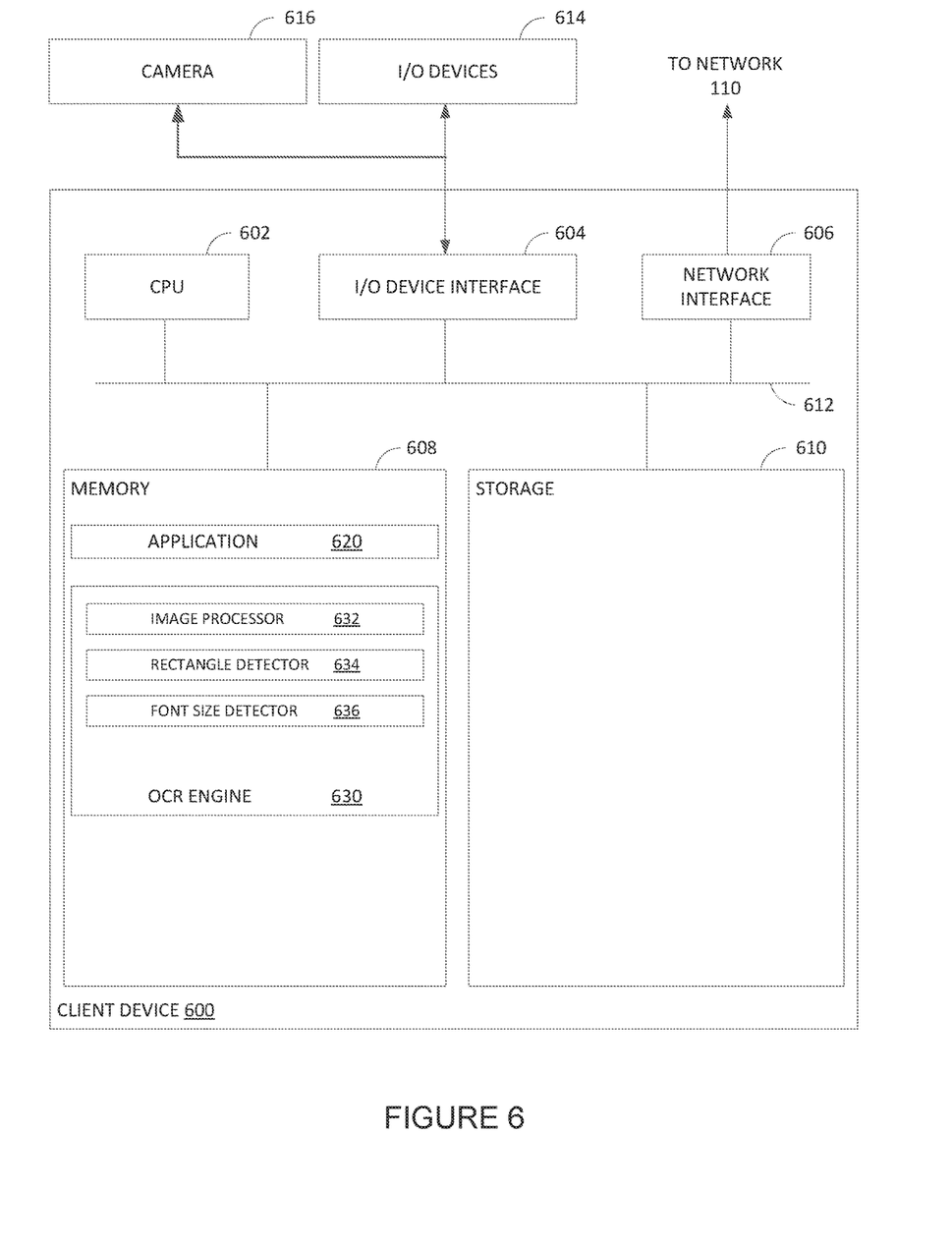
FIG. 6 illustrates an example computing system for real-time detection of font size in digital images to improve the accuracy of optical character recognition processes on documents depicted in the digital images, in accordance with some embodiments.

FIG. 6 illustrates an example client device for performing optical character recognition and font size detection using a digital image, according to an embodiment. As shown, the client device 600 (corresponding to client device 120 of FIG. 1) includes, without limitation, a central processing unit (CPU) 602, one or more I/O device interfaces 604 which may allow for the connection of various I/O devices 614 (e.g., keyboards, displays, mouse devices, pen input, etc.) and camera 616 (e.g., corresponding to camera 121) to the client device 600, network interface 606, a memory 608, storage 610, and an interconnect 612.

CPU 602 may retrieve and execute programming instructions stored in the memory 608. Similarly, the CPU 602 may retrieve and store application data residing in the memory 608. The interconnect 612 transmits programming instructions and application data, among the CPU 602, I/O device interface 604, network interface 606, memory 608, and storage 610. CPU 602 is included to be representative of a single CPU, multiple CPUs, a single CPU having multiple processing cores, and the like. Additionally, the memory 608 is included to be representative of a random access memory. Furthermore, the storage 610 may be a disk drive, solid state drive, or a collection of storage devices distributed across multiple storage systems. Although shown as a single unit, the storage 610 may be a combination of fixed and/or removable storage devices, such as fixed disc drives, removable memory cards or optical storage, network attached storage (NAS), or a storage area-network (SAN).

As shown, memory 608 generally includes an application 620 and an optical character recognition (OCR) engine 630. Application 620, corresponding to application 122 of FIG. 1, may host a variety of workflows that process data received from an image of a document locally and/or provide data received from an image of a document to a remote application service 130 for processing via network interface 606. Application 620 generally provides an interface in which a user can invoke OCR engine 630 to import data from an image of a document into the application 620 for processing.

OCR engine 630 (e.g., corresponding to OCR engine 123), as illustrated, includes an image processor 632, rectangle detector 634, and font size detector 636. Image processor 632, rectangle detector 634, and font size detector 636 correspond to image processor 124, rectangle detector 125, and font size detector 126 of FIG. 1, respectively, whose operations were described above in relation to FIGS. 1-5.

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method for performing optical character recognition on a digital image of a document, the method comprising:
   receiving a digital image of a document having one or more textual components;

finding one or more contours bounding the one or more textual components in the digital image of the document;

detecting a font size for text contained in the digital image using the one or more contours, wherein detecting the font size comprises:

creating one or more bounding rectangles encompassing the one or more contours;

calculating an area bound by each contour of the one or more contours; and for each respective textual component of the one or more textual components bound by a respective contour of the one or more contours, computing a height for the respective textual component by dividing a corresponding area for the respective contour by a width of a corresponding bounding rectangle of the one or more bounding rectangles; and extracting the text from the digital image upon detecting that the detected font size is above a defined threshold value.

2. The method of claim 1, further comprising:

adjusting a height of each bounding rectangle of the one or more bounding rectangles resulting in one or more adjusted bounding rectangles based on a height of each respective textual component of the one or more textual components contained within a corresponding contour of the one or more contours.

3. The method of claim 2, further comprising:

applying a filter to the one or more adjusted bounding rectangles to exclude adjusted bounding rectangles whose corresponding heights are outside a certain range resulting in a list of remaining adjusted bounding rectangles;

calculating a mean height of the remaining adjusted bounding rectangles; and comparing the mean height with one or more subsequent mean heights calculated for one or more smaller chunks of the digital image to detect the font size for the text contained in the digital image.

4. The method of claim 1, further comprising:

prompting a user to perform one or more actions to capture one or more subsequent images of the document upon determining that the detected font size is below the defined threshold value.

5. The method of claim 4, wherein the one or more actions include adjusting a perspective of a camera of a computing device.

6. The method of claim 4, wherein the one or more actions include capturing a plurality of images, each image representing a different segment of the document.

7. The method of claim 1, wherein the digital image comprises a video frame.

8. A system comprising:

a processor;

a memory comprising instructions which, when executed on the processor, performs an operation for performing optical character recognition on a digital image of a document, the operation comprising:

receiving the digital image of the document having one or more textual components;

finding one or more contours bounding the one or more textual components in the digital image of the document;

detecting a font size for text contained in the digital image using the one or more contours, wherein detecting the font size comprises:

creating one or more bounding rectangles encompassing the one or more contours;

calculating an area bound by each contour of the one or more contours; and for each respective textual component of the one or more textual components bound by a respective contour of the one or more contours, computing a height for the respective textual component by dividing a corresponding area for the respective contour by a width of a corresponding bounding rectangle of the one or more bounding rectangles; and extracting the text from the digital image upon detecting that the detected font size is above a defined threshold value.

9. The system of claim 8, further comprising:

adjusting a height of each bounding rectangle of the one or more bounding rectangles resulting in one or more adjusted bounding rectangles based on a height of each respective textual component of the one or more textual components contained within a corresponding contour of the one or more contours.

10. The system of claim 9, further comprising:

applying a filter to the one or more adjusted bounding rectangles to exclude adjusted bounding rectangles whose corresponding heights are outside a certain range resulting in a list of remaining adjusted bounding rectangles;

calculating a mean height of the remaining adjusted bounding rectangles; and comparing the mean height with one or more subsequent mean heights calculated for one or more smaller chunks of the digital image to detect the font size for the text contained in the digital image.

11. The system of claim 8, further comprising:

prompting a user to perform one or more actions to capture one or more subsequent images of the document upon determining that the detected font size is below the defined threshold value.

12. The system of claim 11, wherein the one or more actions include adjusting a perspective of a camera of a computing device.

13. The system of claim 11, wherein the one or more actions include capturing a plurality of images, each image representing a different segment of the document.

14. A non-transitory computer-readable medium comprising instructions which, when executed on one or more processors, performs an operation for performing optical character recognition on a digital image of a document, the operation comprising:

receiving the digital image of the document having one or more textual components;

finding one or more contours bounding the one or more textual components in the digital image of the document;

detecting a font size for text contained in the digital image using the one or more contours, wherein detecting the font size comprises:

creating one or more bounding rectangles encompassing the one or more contours;

calculating an area bound by each contour of the one or more contours; and for each respective textual component of the one or more textual components bound by a respective contour of the one or more contours, computing a height for the respective textual component by dividing a corresponding area for the respective contour by a width of a corresponding bounding rectangle of the one or more bounding rectangles; and extracting the text from the digital image upon detecting that the detected font size is above a defined threshold value.

15. The non-transitory computer-readable medium of claim 14, further comprising:

adjusting a height of each bounding rectangle of the one or more bounding rectangles resulting in one or more adjusted bounding rectangles based on a height of each respective textual component of the one or more textual components contained within a corresponding contour of the one or more contours.

16. The non-transitory computer-readable medium of claim 15, further comprising:

applying a filter to the one or more adjusted bounding rectangles to exclude adjusted bounding rectangles whose corresponding heights are outside a certain range resulting in a list of remaining adjusted bounding rectangles;

calculating a mean height of the remaining adjusted bounding rectangles; and comparing the mean height with one or more subsequent mean heights calculated for one or more smaller chunks of the digital image to detect the font size for the text contained in the digital image.

17. The non-transitory computer-readable medium of claim 14, further comprising:

prompting a user to perform one or more actions to capture one or more subsequent images of the document upon determining that the detected font size is below the defined threshold value.

18. The non-transitory computer-readable medium of claim 17, wherein the one or more actions include adjusting a perspective of a camera of a computing device.

19. The non-transitory computer-readable medium of claim 17, wherein the one or more actions include capturing a plurality of images, each image representing a different segment of the document.

20. The non-transitory computer-readable medium of claim 14, wherein the digital image comprises a video frame.

* * * * *